(No Model.)
V. S. KETCHUM.
FEED BAG.
No. 368,535. Patented Aug. 16, 1887.
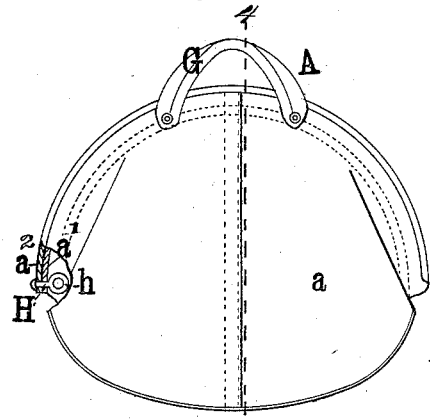
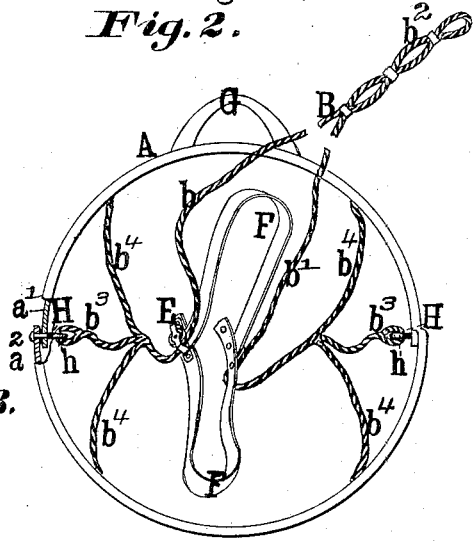
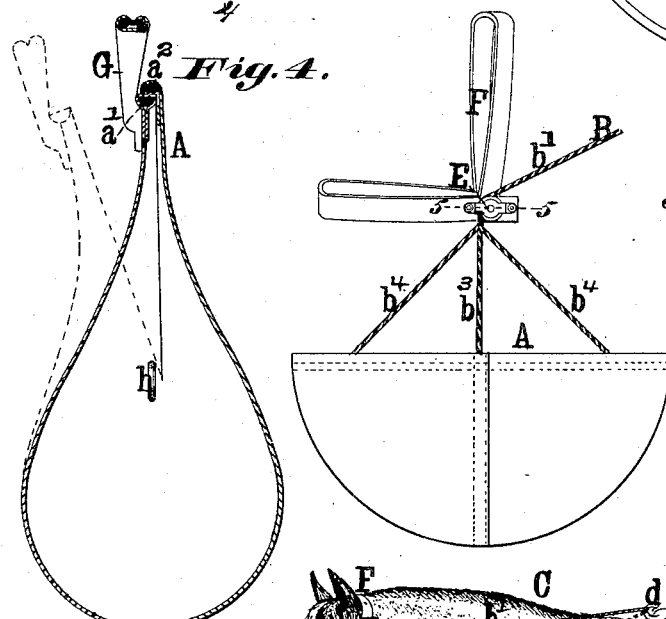
Witnesses:
Peter White
Lillian Brown
Inventor:
Volney S. Ketchum
by C. D. Moody, atty

UNITED STATES PATENT OFFICE.

VOLNEY S. KETCHUM, OF ST. LOUIS, MISSOURI, ASSIGNOR OF ONE-HALF TO LEWIS A. BROWN, OF SAME PLACE.

FEED-BAG.

SPECIFICATION forming part of Letters Patent No. 368,535, dated August 16, 1887.

Application filed April 19, 1887. Serial No. 235,325. (No model.)

*To all whom it may concern:*

Be it known that I, VOLNEY S. KETCHUM, of St. Louis, Missouri, have made a new and useful Improvement in Feed-Bags, of which the following is a full, clear, and exact description.

The improvement relates to that class of feed-bags which in use are attached to the horse, so that when the horse's head is lowered the bag is lifted sufficiently for the horse to reach the feed in the bag, and when the horse's head is raised the bag drops away from it.

The improvement consists, mainly, in the construction of the bag and mode of suspending it, substantially as hereinafter set forth and claimed, and illustrated in the annexed drawings, making part of this specification, in which—

Figure 1 is a side elevation of the improved bag closed as when detached from the horse. Fig. 2 is a plan of the bag as opened, and showing the suspending device. Fig. 3 is an elevation, at right angles to that of Fig. 1, of the bag opened. Fig. 4 is a vertical section on the line 4 4 of Fig. 1. Fig. 5 is a horizontal section, upon an enlarged scale, on the line 5 5 of Fig. 3; and Fig. 6 is a view in perspective showing the improved bag as in use.

The same letters of reference denote the same parts.

A represents the bag proper or feed receptacle.

B represents the cord used in suspending the bag from the horse C, the cord being led from the bag over a bearing upon the horse's head and thence to some fixture—such as the hook $d$ upon the saddle D, Fig. 6—and so that when the horse's head $c$ is lowered the bag is drawn upward, as indicated by the broken lines in Fig. 6, and when the horse's head is lifted the bag is lowered, as represented by the full lines, Fig. 6. The cord passes upward at both sides of the horse's head, and the bearing at each side of the head over which the cord passes is preferably a pulley, E, Figs. 2, 3, 6, upon a headstall, F, and after passing the pulley the two parts $b$ and $b'$ of the cord may be united, as represented at $b^2$, Fig. 2.

Two features especially characterize the bag A. Unlike other feed-bags, it is hemispherical or hemispherico-conical, being rounded at the bottom, and when opened hemispherical in shape, and when closed of the shape shown substantially in Figs. 1, 2. The feed in consequence always drops to the center of the bottom of the bag, where it is convenient for the horse to reach it, and when the bag is closed it becomes a receptacle not only for the feed, but also for the cord and headstall, or whatever is used to suspend the bag, and capable of being readily transported either in a carriage or attached to a saddle, and with safety to its contents. The other feature is the frame at the top of the bag and the mode of connecting the bag with the cord. The canvas $a$ is attached to two semicircular bars, $a'\ a^2$. These bars are hinged together, so that the bag can be opened, as in Figs. 2, 3, 6, and closed, as in Figs. 1, 4. When the bag is opened, the bars serve to keep its mouth from collapsing—a trouble incident to the use of the ordinary feed-bag—and when the bag is closed the bars fit the one, $a'$, within the other, $a^2$, Figs. 1, 4, and thus whatever weight is within the bag tends to keep the bag closed. The handle G is attached to that side of the bag whose bar $a'$ is within the other bar. A handle on the opposite side of the bag is unnecessary. The bars are hinged together, preferably by means of the pins H, which pass through the bars and at the inner end are shaped to form an eye, $h$, to which the middle one, $b^3$, of the three cord ends $b^3\ b^4\ b^4$ is attached, for in the place of simply fastening the cord B to the bag the cord is at its point of connection with the bag made in three parts, the middle one, as stated, being attached to the bag immediately at the hinge, and the other two being attached to the bars at the sides, respectively, of the hinge. By this means the sides of the bag are upheld and prevented from dropping below the center of the bag, and the bag swings as one rigid piece from the horse's head,

I claim—

The hemispherical nose-bag A, having handle G and provided with the semicircular bars $a'$ $a^2$, secured to the upper end of the bag and hinged together by pins H, each having an eye, $h$, so that when said bars are closed the one bar fits within the other, combined with the side cords, B, each having three ends, $b^3$ $b^2$, and the headstall F, having pulleys E, over which said cords are moved.

VOLNEY S. KETCHUM.

Witnesses:
C. D. MOODY,
A. M. EVERIST.